United States Patent [19]

Williams

[11] 3,969,782
[45] July 20, 1976

[54] TWO BRUSH VEHICLE COORDINATED AUTOMATIC WASHER

[76] Inventor: Robert D. Williams, 4338 Oakwood, La Canada, Calif. 91011

[22] Filed: May 16, 1974

[21] Appl. No.: 470,441

[52] U.S. Cl. ............................ 15/53 AB; 15/DIG. 2
[51] Int. Cl.² .......................................... B60S 3/06
[58] Field of Search ............. 15/DIG. 2, 21 D, 21 E, 15/53, 97, 53 A, 53 AB

[56] References Cited
UNITED STATES PATENTS

| | | | |
|---|---|---|---|
| 2,705,810 | 4/1955 | McDermott | 15/21 D |
| 3,517,405 | 6/1970 | Hanna et al. | 15/21 D |
| 3,523,320 | 8/1970 | Williams | 15/21 D |
| 3,839,762 | 10/1974 | Baker | 15/21 D |

*Primary Examiner*—Edward L. Roberts
*Attorney, Agent, or Firm*—Christie, Parker & Hale

[57] ABSTRACT

A unitary frame of an automatic vehicle wash mounts a first and second brush in the path of an advancing vehicle for one brush to scrub the front and one side of the vehicle and the other brush the other side and rear. The frame defines the support and dimensional relationship for the brushes and attendant washing equipment, such as a mitting machine, shampoo applicator and rinsers. The brushes travel in arcs about axes on diagonally opposed posts of the frame and pass beneath elements of the frame. To accommodate this travel along the vehicle path, both the brushes are offset and posts of the frame are staggered. Vehicle contact determines each brush's position along its arc. A tension spring urges the brushes together. The tension in the spring is always maintained to prevent spring sag onto a vehicle, assure positive control of brushes, and prevent brush position reversal. Tension is maintained by pivots which engage anchor cables for the spring and lengthen the distance between attachment points of the cables on support arms when the brushes are relatively close to one another.

11 Claims, 10 Drawing Figures

TWO BRUSH VEHICLE COORDINATED AUTOMATIC WASHER

BACKGROUND OF THE INVENTION

The present invention relates to vehicle washing apparatus in general, and, in particular, to an improved vehicle washing apparatus which is especially adapted for use where the length available for the apparatus is limited and which needs but two brushes to scrub all the vertical surfaces of a vehicle.

Vehicle washing by automated or semi-automated machinery is popular because of time saved and, in fleet operations, economy. Vehicle washing apparatus vary in complexity and in quality of end result. The simple side is exemplified by a coin-operated hose having a spray gun which dispenses a high pressure water and detergent mixture at the direction of its user. On the complex side are elaborate systems employing agitating brushes and mittens for contacting the exposed surfaces of a vehicle, automatic sprayers for dispensing washing solutions and rinses, and dryers. The systems employing brush agitation remove films normally left with the simple spray type apparatus.

Brush systems also vary in their complexity. Some of these systems employ two sets of two brushes, with each set servicing an opposite half of the lateral surfaces of a vehicle. Thus one set scrubs the right front, right side and right rear of a vehicle and the other set scrubs the corresponding left surfaces.

There are brush systems where a brush set on one side of the path of a vehicle brushes the front, back and one side of the vehicle, while another brush or brush set brushes only the remaining side of the vehicle.

An example of a brush system employing two sets of two brushes, with each set of brushes acting primarily on only one side of a vehicle, is described in U.S. Pat. No. 3,523,320 to R. D. Williams. Each brush set in the Williams system employs two brushes coordinated together by a tension spring, which tends to close the brushes.

In many applications, however, there simply is not enough room to accommodate the straight path of a vehicle through a washing system employing a set of two brushes for one side of a vehicle. This is especially true when the washing facility requires attendant apparatus to mit and dry.

For ease of assembly on location at a vehicle washing site a vehicle washing mechanism must be basically simple. For ease of adaptability, the system itself must readily accommodate different environments. Additionally, the system must be rugged to withstand the constant jarring associated with vehicle traffic through the system and occasional abuse by a vehicle passing through the facility, the latter being a problem especially where the vehicle is driven through the system by a customer.

SUMMARY OF THE INVENTION

The present invention provides a vehicle washing apparatus which is longitudinally compact and of rugged construction, and which employs but two brushes to scrub all the vertical surfaces of a vehicle. An aspect of the invention employs means for preventing a pair of laterally opposed brushes from passing each other to occupy a position along the path of a vehicle opposite from that required for brush movement with a vehicle. More in particular, this means includes a biasing spring which tends to pull the brushes together and means to maintain tension on this spring when the brushes are close together so that the brushes will interfere with each other and will not pass each other. The means also prevents spring sag onto a vehicle when the brushes are in close proximity to each other.

The apparatus of the present invention, in one embodiment, envisions a unitary frame structure for supporting a pair of arms, each of the arms being part of one brush assembly. The arms are rotatable about vertical axes on the unitary frame. The frame includes lateral bridging beams secured to upright posts on either side of the path of the vehicle. Thus both sides of the frame are tied together through the bridging beams. Fore and aft, preferably elevated, beams tie posts on the same side of the path together. To effect a short overall length the distance along the length of the system between brush arm rotation axes must be relatively short. As previously mentioned, rotation axes are on the unitary frame. To accomplish this, the frame structure which supports and unites the brushes beginning at, say, the entrance end of the facility has a first vertical post to one side of the path of the vehicle. This post supports one brush. Progressing from the entrance end of the facility, a second post stands longitudinally spaced from the first but on the opposite side of the vehicle path. There are no corresponding posts for the first and second posts on the laterally opposite sides of the path. The space thus provided is occupied by the brushes when they are in their open or most distal position, and the space is required because brush arm length must be long to scrub all the vertical surfaces of a vehicle with two brushes, including the front and rear surfaces of the vehicle. At the entrance end of this structure an arch with two vertical posts on each side of the path ties in with the balance of the frame to provide the requisite support and structural unity. If desired, a second or more arches can be provided to accommodate the likes of shampoo dispensing nozzles and a mitting machine.

A specific form of the device which prevents brush reversal employs a tension spring to urge the brushes towards each other. The brushes are forced away from each other by a vehicle passing between them. Since one of the brushes traverses the rear and one side of a vehicle and the other brush traverses the front and the other side of the vehicle, the arms for the brushes must sweep long arcs. The arc length is such that normal tension springs would slacken when the brushes are proximate each other. When the brushes slaken, they are free from one another and it is possible for one to move past the other and the brushes to become reversed. During the time of brush proximity to one another, the path between the anchor points of the tension spring is lengthened and tension maintained. This is preferably accomplished by a loop attached to each arm and an inside vertical surface of each loop acting on a cable joining the spring to its anchor points. Maintaining spring tension also prevents spring sag. For aggravated impact, positive interior stops can be used to prevent the brushes from traveling past each other.

These and other features, aspects and advantages of the present invention will become more apparent from the following description, appended claims and drawings.

DESCRIPTION OF THE PREFERRED EMBODIMENT

Figure 1:
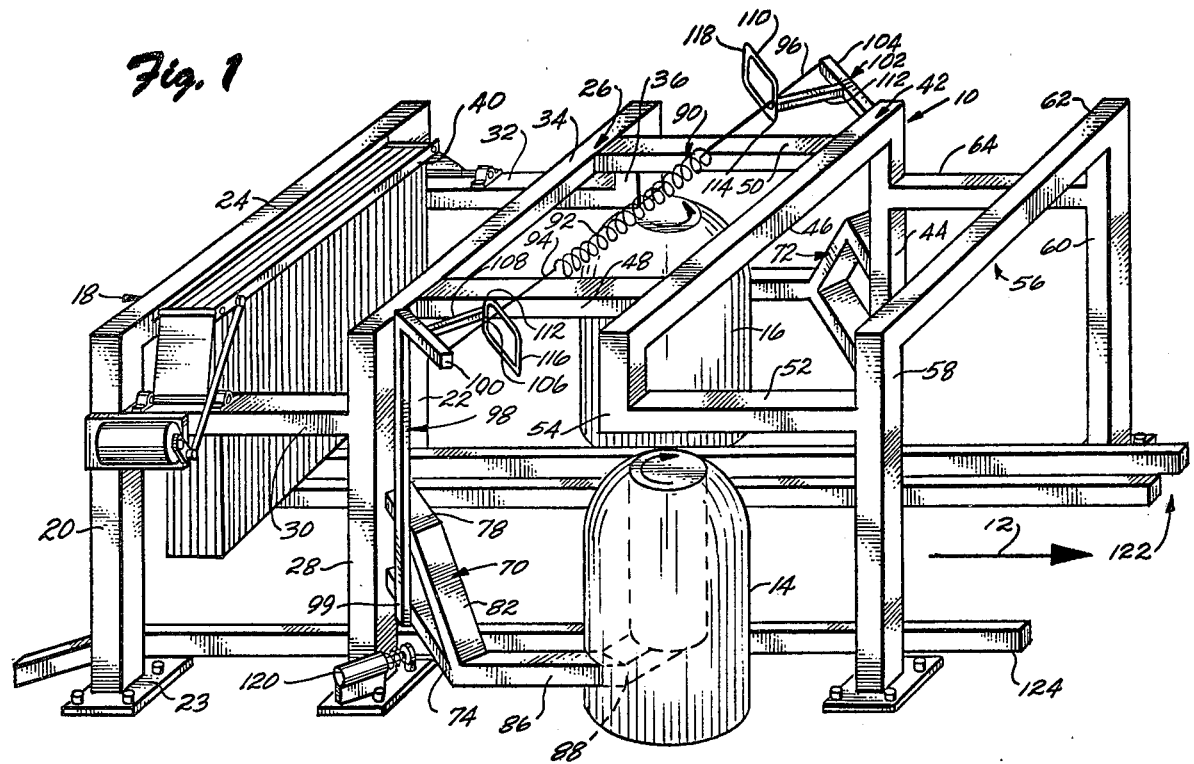
FIG. 1 is a perspective view of the vehicle washing apparatus of the present invention.

With reference to FIG. 1 the present invention contemplates a vehicle washing apparatus having a unitary frame 10. A vehicle passes through and beneath the frame along a path 12, indicated by a direction arrow and oriented along the longitudinal axis of the frame.

The frame supports a first brush 14 and a second brush 16, with the brushes being located on opposite sides of the path and staggered along the path. The brushes are mounted on the frame for rotational movement towards and away from each other along intersecting arcs of equal radii. The rotational axes are also staggered along the path. To effectively traverse the width of a vehicle by each brush, each brush arc has a relatively long radius and a relatively long path in comparison with previously known brush systems. Each arc passes through the lateral limits of the frame on its own side. As is illustrated in FIG. 1, to accommodate these paths, the frame must not interfere. Interference is avoided by the unitary frame through the omission of vertical posts in the path of the brushes.

More specifically, interference by the frame is avoided by staggering pairs of posts on the same side of path 12 from pairs of posts on the opposite side. Staggering is effected as follows. Unitary frame 10 includes an arch 18, which may mount shampoo plumbing. This arch has a pair of vertical posts 20 and 22 which may be anchored to the floor of a washing facility in a well known manner, as by base plates 23 staked to the floor. These posts are connected together by a horizontal bridging beam 24 which lies perpendicular to path 12 and well above the height of a vehicle using the washing apparatus. A generally L-shaped beam assembly 26 is generally parallel to shampoo arch 18 and is spaced from that arch along path 12. This assembly can house pre-rinse plumbing. A vertical post 28 of the pre-rinse arch is adapted to be mounted on the floor of the facility in the manner of posts 20 and 22. There is no post laterally opposite post 28 and room is provided for the path of brush 16. The pre-rinse L-beam assembly is united with the shampoo arch through parallel and spaced longitudinal beams 30 and 32. Beams 30 and 32 are on opposite sides of path 12 and in the plane of the posts on this side of the frame. Beam 30 connects posts 20 and 28 and may be welded to these posts. Beam 32 is connected to a laterally extending, horizontal bridging beam 34 of the L-beam assembly. The lateral beam is connected to post 28 as by welding or a bolted joint. Longitudinal beam 32 is connected to laterally extending beam 34 through a vertical, abbreviated beam 36. The space above beams 30 and 32 and between beams 24 and 34 define a cradle or bed for such vehicle washing paraphernalia as a mitting machine 40.

A second L-shaped beam assembly 42 is spaced along path 12 from the first L-beam assembly. This assembly has a post 44 and a laterally extending, horizontal bridging beam 46 joined together by a weld. Post 44 is on the side of path 12 opposite from post 28, and thus is diagonally disposed with respect to that post with the diagonal crossing the path. Beam 46 and hence the L-beam of which it forms a part are connected to beam 34 through a pair of longitudinal, parallel and spaced-apart overhead beams 48 and 50. The end of beam 46 opposite its junction with post 44 is joined to a longitudinally extending outside beam 52 through a vertical beam section 54.

A final arch 56 has a pair of spaced-apart, path-straddling posts 58 and 60 which again may be attached to the floor of the facility in which the washing unit is placed in a well known manner, as by staking. Posts 58 and 60 are joined by a laterally extending, horizontal bridging beam 62 at the top of the posts. Again, beam 62 is high enough so that a vehicle can pass beneath it. A longitudinal beam 64 unites posts 44 and 60 and complements beam 52 to define a cradle or bed for washing apparatus paraphernalia. Posts 20, 28 and 58, section 54, and beams 30 and 52 are in the same plane. The complementary structure on the opposite side of the path are also coplanar.

It should be noted that frame 10 can be reversed 180° and present the identical arrangement illustrated. Thus it does not matter which end of the frame section is regarded as the entrance and which end is regarded as the exit.

To facilitate ease of assembly, longitudinal beams 48 and 50 can be placed in the field. Obviously, a further breakdown is possible to accommodate the circumstances.

Brushes 14 and 16 and how they operate are described sufficiently in U.S. Pat. No. 3,523,320 to R. D. Williams. This patent also describes arms for pivotally connecting the brushes to a frame. The arm construction of the present invention is very similar to the arm construction shown and described in the patent except that the arms of this invention are longer.

Figure 2:
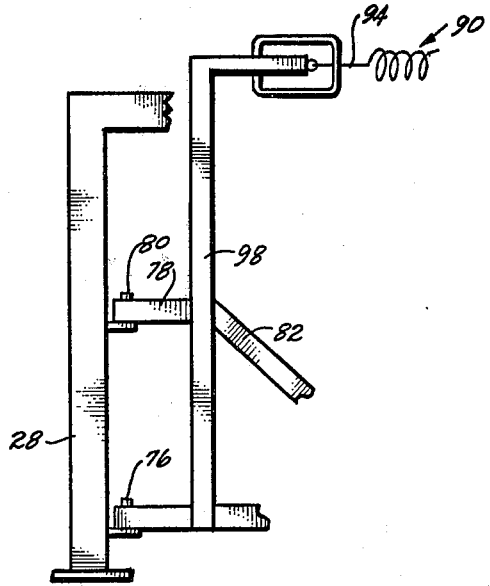
FIG. 2 is a fragmentary elevational view of a brush arm and carried coordinator spring and anti-slack device as viewed looking towards the vehicle path of the apparatus of FIG. 1.

For convenience, however, the arm and brush construction will be briefly described. Two arms are provided, arms 70 and 72 for brushes 14 and 16, respectively. Inasmuch as the description of one arm and brush is the description of both, only one will be described. With reference to FIGS. 1 and 2 and arm 70, the arm has a horizontal base 74 which is rotationally mounted to post 28 on a pivot pin 76, the latter being attached to the post. Spaced above base 74 a parallel member 78 is connected to post 28 through a pivot pin 80 attached to the post. A diagonal 82 connects members 74 and 78. A cantilever extension 86 of base 74 through an angular offset end 88 supports brush assembly 14. The latter assembly includes within it a motor drive.

The arm and the brushes carried by them are urged together through a spring assembly 90. This assembly includes a tension spring 92, the ends of which are connected to cables 94 and 96. An upside-down, L-shaped bracket 98 is vertically mounted on arm 70 along a vertical leg 99 of the bracket. An upper horizontal leg 100 of this bracket provides an anchor for cable 94. An identical bracket 102 is provided for arm 72. The bracket has a horizontal leg 104, the end of which provides an anchor for cable 96. Each horizontal bracket leg mounts an anti-slack and guide loop. Thus bracket 98 mounts a loop 106, the plane of which generally parallels the length of horizontal leg 100 of bracket 98. A spacing bar 108 actually connects the loop to the horizontal section so that the former is spaced from the latter. In like manner, a loop 110 is spaced from horizontal leg 104 of bracket 102 by a bar 112 with the loop paralleling the length of the horizontal leg. Cables 94 and 96 are threaded through loops 106 and 110 and thus the cables are captured by the loops. Vertical rungs of the loops bear against the cable at various orientations of the brushes. As illustrated in FIG. 1, with the brushes in their open position, an inside rung 112 of loop 106 and an inside rung 114 of loop 110 bear on the cables to effectively lengthen the distance between the anchor points as measured along the length of the cables through the spring by putting an angle in the tension path between the anchor points and lengthening the spring. This lengthening of the anchor points increases the tension in the spring and thus the force tending to pull the brushes together.

Figure 3:
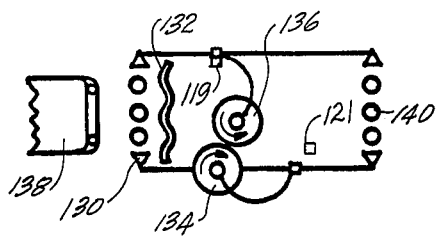
FIGS. 3 through 10 are schematic views illustrating progressive steps in a typical wash cycle employing the apparatus of the present invention.
Figure 4:
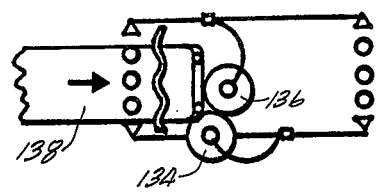
Figure 5:
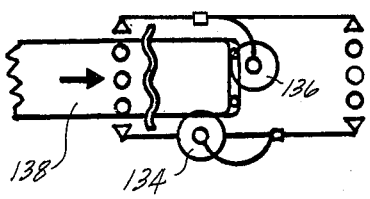
Figure 6:
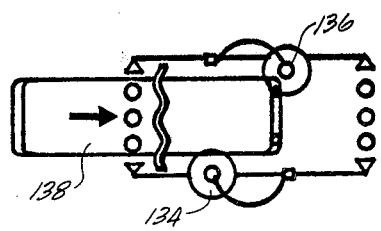
Figure 7:
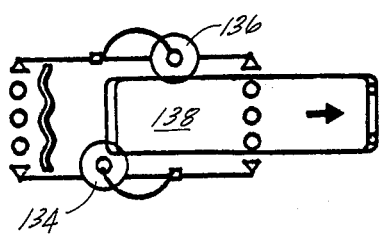
Figure 8:
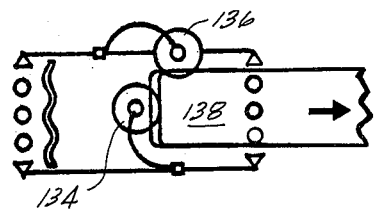
Figure 9:
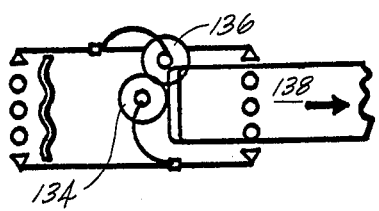

As opposed to the distal displacement illustrated in FIG. 1, the brushes also have a proximal relationship whereby they essentially touch one another as illustrated in FIGS. 3 and 4. In this relationship vertical rungs 116 and 118 of loops 106 and 110, opposite rungs 112 and 114, again increase the tension path between the anchor points of the spring assembly by making the path between the anchor points not a straight line. This latter accomplishment is especially important to prevent brush reversal. If the brushes were free and unconstrained, then each could move relative to the other under a relatively modest force. If the complementary brush did not resist this movement, the brushes could pass and reverse positions. Because the direction of path 12 is fixed, the reversal of the brushes would incapacitate the machine. The lengthened path also prevents spring system sag onto a vehicle. For aggravated cases of vehicle contact of a brush positive interior stops will prevent brush reversal. These stops are shown in FIG. 3 at 119 and 121. The spring accomplishes its coordination and brush reversal prevention function, the latter with the aid of the anti-slack and guide loops, very smoothly.

Arms 70 and 72 are mounted to their posts with their pivots off the vertical in a direction for gravity aided approximation of the brushes; that is, gravity tends to urge the brushes into their home position.

Attendant apparatus of the present invention includes the provision of shock absorbers for acting on the arms to absorb the energy that the arms have when they tend to open. Thus for arm 70 a shock absorber 120 is provided which would absorb energy which tends to open the arm.

As previously mentioned, the apparatus is suitable for various washing mechanisms with a mitting machine 40 being specifically illustrated. The machine itself is in the prior art and thus will not be described. As is also typical in vehicle washing facilities, means are provided to guide a vehicle through the mechanism along a desired path. Such means may be wheel tracks 122 and wheel guide 124. As is also typical in car washing applications "arches" provide the mounts for the dispensing of processing liquids and streams of drawing air. In the embodiment illustrated, arch 18 houses shampooing nozzles and attendant plumbing for directing a washing solution of a washing agent and water onto a vehicle passing underneath the arch. After the solution is applied, mitting machine 40 mits upper and horizontal surfaces of the vehicle. Subsequently a pre-rinse solution can be dispensed through L-shaped beam assembly 26 and a second pre-rinse through L-shaped beam assembly 42. A final rinse can be provided through known nozzles and plumbing in arch 56.

The operational sequence of the brush system and mechanism of the present invention will be readily understood with reference to FIGS. 3 through 10. In these Figures, the shampoo arch is indicated at 130 and the mitting machine is indicated at 132. A pair of cooperating brush sets 134 and 136 are shown on opposite sides of a path for a vehicle 138 through the apparatus These brushes are coordinated identically to brushes 14 and 16. However, to illustrate the flexibility of the apparatus the rotational axis of each of the brush arms is reversed so that the arm of the brush on the right side of a vehicle path is rotatably connected to the frame further along the path than the brush arm on the left side of the path, whereas in the FIG. 1 embodiment just the opposite is the case. An arch 140 at the exit from the apparatus corresponds to rinsing arch 56.

As a vehicle approaches the apparatus it activates a shampoo dispenser, a mitting machine and brushes. The vehicle is addressed slowly to the machine and shampoo is applied by the shampoo dispenser in the arch. The mitting machine effectively cleans the upper and horizontal surfaces of the vehicle as well as surfaces joining the top surfaces with lateral surfaces. The front right corner of the vehicle is brushed by brush 134, as is seen in FIG. 4. Simultaneously the front right of the vehicle is scrubbed by brush 136. As the vehicle progresses through the apparatus, brush 134 brushes the right side of the vehicle and brush 136 brushes the front of the vehicle and ultimately the left side, as is shown progressively in FIGS. 5 through 7. Commencing at the position shown in FIG. 7, brush 134 begins to wrap around the rear of the vehicle for cleaning it, with the cleaning effected as the vehicle progresses through the apparatus. Finally, in FIG. 10, the brushes return to their home position to await the next vehicle.

Figure 10:
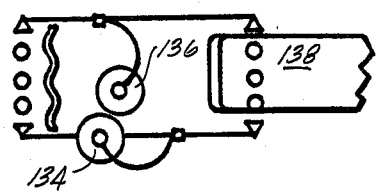

The present invention provides an extremely facile frame assembly. From the foregoing description it is apparent that the frame can be readily erected and that it is extremely rigid. Accordingly, initial installation costs and purchase price are reasonable and the unit provides the rigidity required against the abuses of service. Perhaps more importantly, the frame construction facilitates a short path length through the apparatus so that the apparatus can be fitted into limited length facilities. The anti-slack device is extremely simple and allows use of the full lateral surface brushing by just two brushes. As an example, the facility and adaptability of the apparatus of the present invention is adapted for use in a so-called drive-in and back-out system so long as a vehicle is not allowed to progress into the position illustrated in FIG. 10. More specifically, so long as the vehicle is not allowed to pass to position where upon backing the vehicle the brushes are urged by the vehicle in a direction opposite from that desired, the apparatus is satisfactory. In FIG. 10 the movement of the brush arm for brush 136 in the wrong direction would be clockwise.

The present invention has been described with reference to a certain preferred embodiment. The spirit and scope of the appended claims, however, should not necessarily be limited to the foregoing description.

What is claimed is:

1. In a vehicle wash apparatus having a vehicle path therethrough, an improvement comprising:

a. a unitary frame including:

i. a first arch having a pair of spaced-apart vertical posts straddling the path and a beam bridging the path and connecting the posts;

ii. a first L-shaped beam assembly adjacent to the first arch, and spaced from and parallel to the first arch, the L-shaped beam assembly having a vertical post to a first side of the path and a horizontal beam over the path;

iii. a second L-shaped beam assembly adjacent to the first L-shaped beam assembly and spaced from and parallel to the first beam assembly on the opposite side thereof from the first arch, the second L-shaped beam assembly having a vertical post to a second side of the path, the second side being opposite the first side, and a horizontal beam over the path;

iv. a second arch having a pair of spaced-apart vertical posts straddling the path and a beam bridging the path and connecting the posts, the second arch being adjacent to the second L-shaped beam assembly and spaced from and parallel to the second L-shaped beam assembly on the opposite side thereof from the first L-shaped beam assembly; and v. beam means along the path rigidly interconnecting both arches and both L-shaped beam assemblies;

b. a first brush assembly having an arm rotatably secured to the vertical post of the first L-shaped beam assembly and an arc of rotation which intersects an imaginary line below the distal end of the horizontal beam of the second L-shaped beam assembly;

c. a second brush assembly having an arm rotatably secured to the vertical post of the second L-shaped beam assembly and an arc of rotation which intersects an imaginary line below the distal end of the horizontal beam of the first L-shaped beam assembly; and d. means for coordinating brush movement in response to vehicle movement along the path.

2. The improved vehicle wash apparatus claimed in claim 1 wherein the beam means includes first and second spaced-apart beams parallel to the path and interconnecting the posts of the first arch with the post and the distal end of the first L-shaped beam assembly, respectively.

3. The improved vehicle wash apparatus claimed in claim 2 wherein the first and second beams of the beam means are spaced above the path and below the tops of the bridging beam of the first arch and the horizontal beam of the first L-shaped beam assembly to define a cradle for attendant wash apparatus equipment.

4. The improved vehicle wash apparatus claimed in claim 2 wherein the beam means includes third and fourth spaced-apart beams parallel to the path and interconnecting the posts of the second arch with the post and the distal end of the second L-shaped beam assembly, respectively.

5. The improved vehicle wash apparatus claimed in claim 3 wherein the beam means includes third and fourth spaced-apart beams parallel to the path and interconnecting the posts of the second arch with the post and the distal end of the second L-shaped beam assembly, respectively, and the third and fourth beam means being spaced above the path and below the tops of the bridging beam of the second arch and the horizontal beam of the second L-shaped beam assembly to define a cradle for attendant wash apparatus equipment.

6. The improved vehicle wash apparatus claimed in claim 1 wherein the beam means includes beams over and parallel to the path and interconnecting the L-shaped beam assemblies.

7. The improved vehicle wash apparatus claimed in claim 3 wherein the beam means includes beams over and parallel to the path and interconnecting the L-shaped beam assemblies.

8. The improved vehicle wash apparatus claimed in claim 5 wherein the beam means includes beams over and parallel to the path and interconnecting the L-shaped beam assemblies.

9. The improved vehicle wash apparatus claimed in claim 1 wherein the coordinating means includes:

a. a tension spring urging the arms together; and b. means for increasing the tensile path of the spring when the brushes are relatively close together to maintain tension in the spring.

10. The improved vehicle wash apparatus claimed in claim 1 wherein the coordinating means includes:

a. a tension spring for urging the arms together;

b. first and second cable means attaching the spring to the arms of the first and second brush assemblies;

c. a first member attached to the arm of the first brush assembly for bearing against the first cable means and increasing the tension in the spring when the brushes are proximate; and d. a second member attached to the arm of the second brush assembly for bearing against the second cable means and increasing the tension in the spring when the brushes are proximate.

11. The improved vehicle wash apparatus claimed in claim 10 wherein the coordinating means members comprise loops capturing their respective cables and having vertical rungs for the engagement of the cables.

* * * * *